United States Patent Office 3,528,908
Patented Sept. 15, 1970

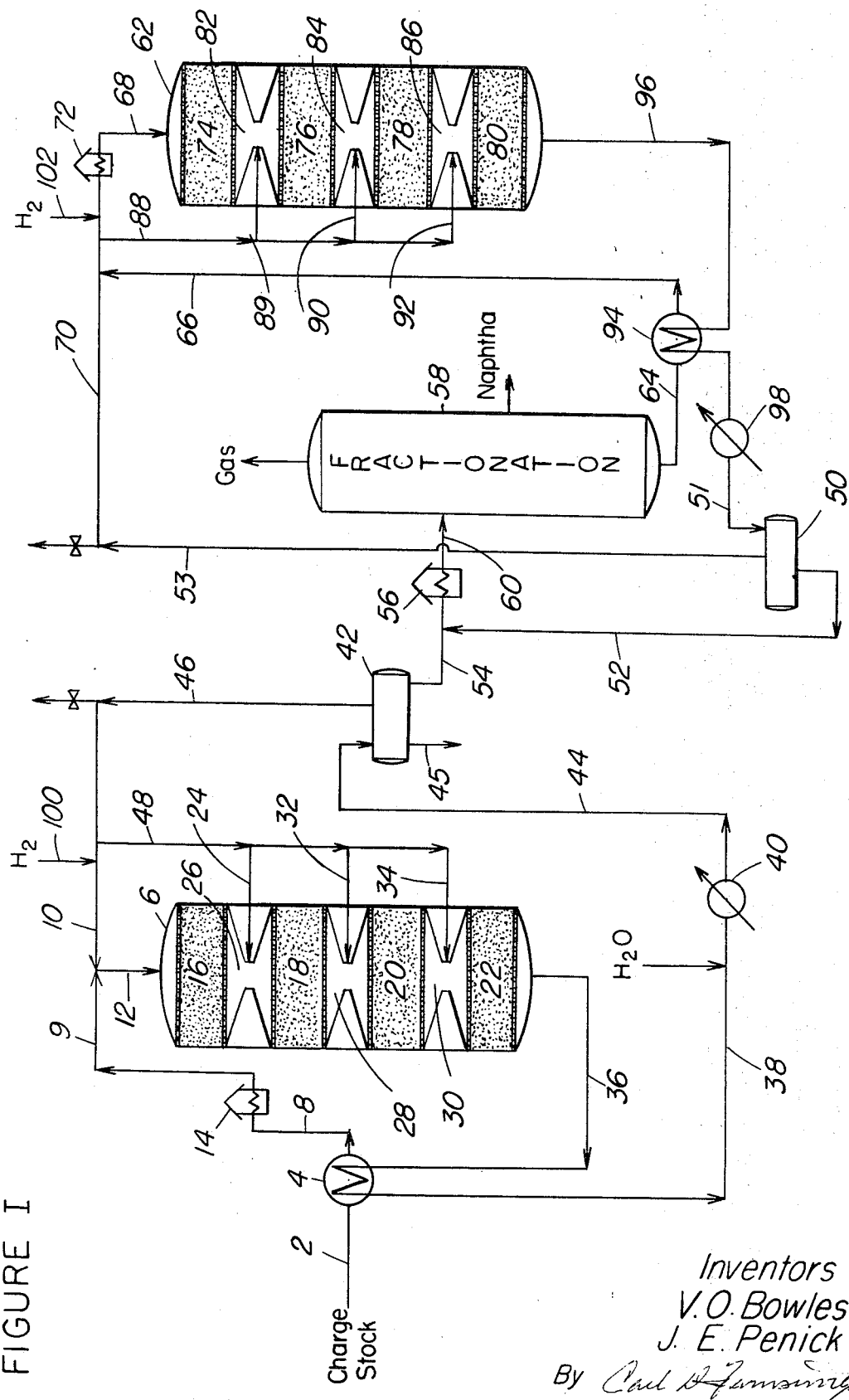
FIGURE I

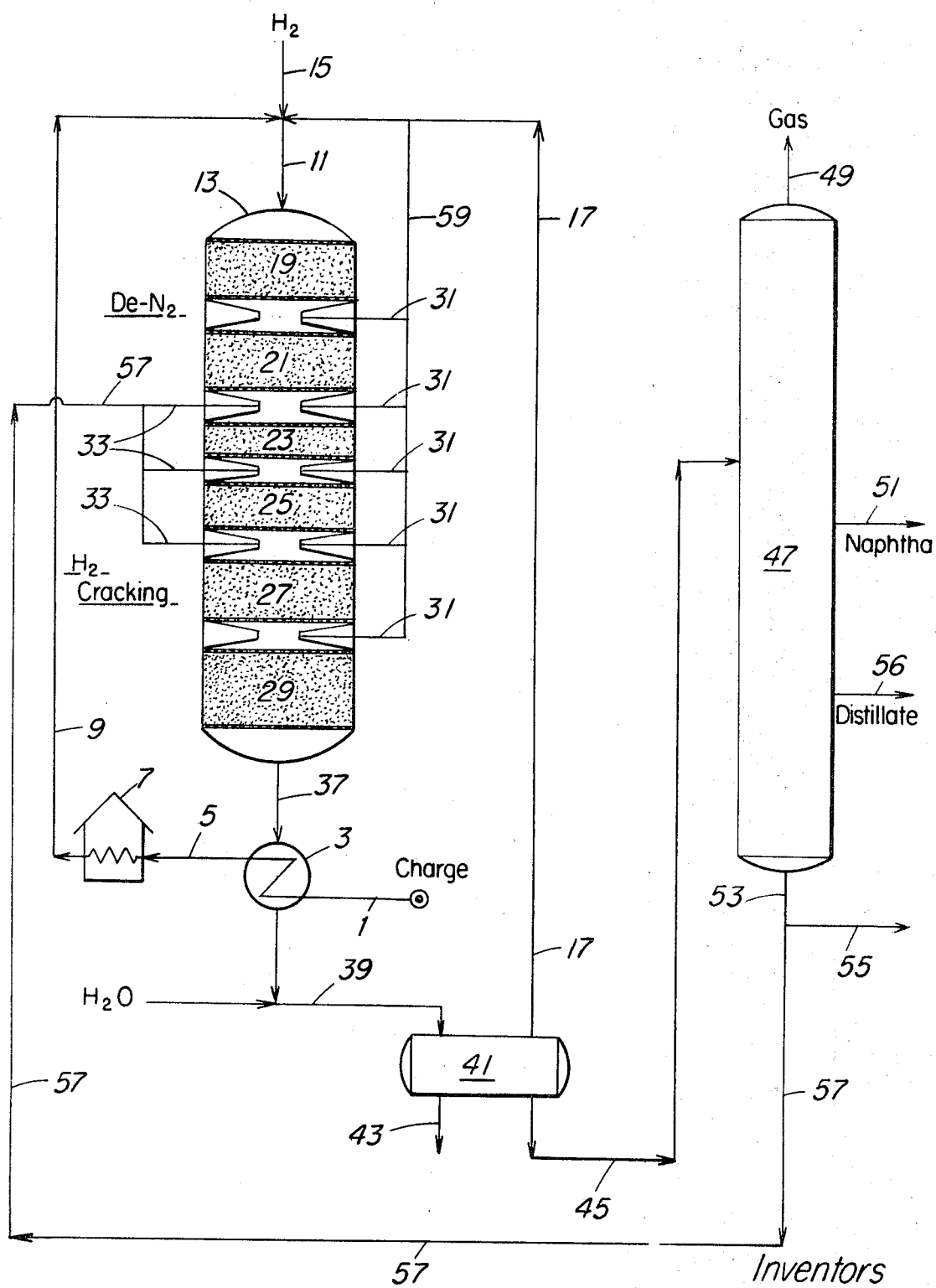
FIGURE II

3,528,908
CATALYTIC HYDROCRACKING PROCESS EMPLOYING ASCENDING REACTION TEMPERATURES
Vernon O. Bowles, Katonah, N.Y., and Joe E. Penick, Rolling Hills, Calif., assignors to Mobil Oil Corporation, a corporation of New York
Filed Nov. 17, 1967, Ser. No. 684,065
Int. Cl. C10g 23/00, 13/02
U.S. Cl. 208—89        6 Claims

ABSTRACT OF THE DISCLOSURE

Gasoline boiling range hydrocarbons are produced by passing a relatively high boiling petroleum hydrocarbon feed containing nitrogen and sulfur impurities sequentially in contact with a first hydrogenation catalyst and then one or more hydrocracking catalysts arranged in series in one or more reactors wherein each reactor contains a plurality of catalyst beds. In the plurality of catalyst beds the hydrocarbon reactant material in the presence of hydrogen is initially contacted with a catalyst which operates efficiently at relatively low temperatures to convert combined nitrogen to ammonia and thereafter the hydrocarbon feed contacts a catalyst or catalysts which operate(s) more efficiently at relatively higher temperatures and demonstrate(s) a greater tolerance to nitrogen. The exothermic heat released from the reactions is employed to advantage to maintain a desired ascending temperature through the plurality of catalyst beds in the direction of reactant flow.

BACKGROUND OF THE INVENTION

Field of the invention

Recently, there has been an increased incentive toward the use of catalytic hydrocracking processes to produce fuels, especially gasoline and higher boiling products suitable for producing lube oils. Hydrocracking has found special use in converting straight run gas oils as well as relatively refractory feeds containing aromatic polycyclic hydrocarbons to lower boiling products such as gasoline and light distillates including jet fuels and diesel fuels without excessive gas or coke formation.

Hydrocracking is an exothermic reaction and the increased temperature caused by reaction with hydrogen in contact with the catalyst needs to be controlled so as to avoid seriously degrading catalyst selectivity and activity or causing excesively high temperatures which might damage the reactor. To avoid exceeding a specified and desired maximum outlet temperature, it has been common practice either to provide the incoming feed at a sufficiently low temperature but above the reaction threshold temperature or to cool the feed and reaction products within the reactor between catalyst beds. Thus, it is common practice to control reaction temperature within the reactor by providing means for introducing a considerable amount of quench medium for mixing with reactants and product material between catalyst beds in the reactor in order to cool the reaction effluent recovered from one bed to a relatively low temperature before entering a lower bed of catalyst.

The catalysts employed to effect hydrocracking reactions contain, for example, an active cracking component in combination with one or more hydrogenating components. At the present time, hydrocracking can be effected in the presence of a hydrocracking catalyst containing either an amorphous cracking component or a crystalline aluminosilicate cracking component. Hydrocracking catalysts, however, vary considerably in degree of sensitivity to temperature and ammonia under hydrocracking conditions depending upon their composition. Thus, it may be said that relatively high ammonia concentrations during hydrocracking will seriously adversely affect the activity (temperature requirement) and selectivity of some hydrocracking catalysts while a much less adverse effect or even a favorable effect will be had on other catalyst compositions. Generally, it can be stated that hydrocracking catalysts containing an amorphous cracking base are much more sensitive to concentrations of ammonia than are hydrocracking catalysts containing a crystalline aluminosilicate cracking base. It has also been found, however, that crystalline aluminosilicate hydrocracking catalysts are quite stable at relatively high hydrocracking temperatures in the presence of ammonia and they also provide a very satisfactory yield efficiency at these conditions. In addition, it has been found that these catalysts exhibit improved selectivity toward aromatic products at the higher temperatures in the presence of ammonia. However, even with these higher operating temperature catalysts, the reaction temperature must not be allowed to become excessive.

Description of the prior art

At the present time, reactors suitable for hydrocracking and containing a plurality of vertically spaced apart catalyst beds which extend substantially the horizontal width of the reactor are available. Means are also provided in suitable spaces between the catalyst beds for injecting a cooling fluid such as a cool gas, usually hydrogen-containing recycle gas. The cooling gas introduced in appropriate quantity reduces the temperature of the hydrocarbon effluent between catalyst beds before the effluent makes contact with the next adjacent catalyst bed. This type of arrangement has heretofore been found relatively effective with a reactor containing a plurality of catalyst beds because of the need to limit the temperature rise in any one bed to a predetermined low limit to avoid excessive catalyst aging which would contribute to relatively poor selectivity. It is generally impractical to employ low feed inlet temperatures as the only means for regulating reactor outlet temperatures. Furthermore, a substantial amount of cooling fluid has been required in the prior art designs to cool the hydrocarbon effluents recovered from each catalyst bed to maintain relatively constant operating temperatures and to prevent runaway temperature conditions developing in the reactor. This requirement for large amounts of cooling gas necessarily undesirably increases the total volume of vapor including hydrogen-rich gas passed through the reactor thereby seriously limiting the amount of hydrocarbon reactant material which could be processed in any single reactor.

It is generally known that catalytic hydrocracking to produce gasoline may be carried out by contacting a hydrocarbon feed first with an amorphous base hydrogenation catalyst and then with a crystalline aluminosilicate hydrocracking catalyst. The contact with the crystalline aluminosilicate base hydrocracking catalysts has generally been carried out in a separate reactor at about the same average temperature or at a lower average temperature than the temperatures employed for contact with the amorphous base hydrogenation catalysts.

U.S. Pat. 3,287,252, issued Nov. 22, 1966, discloses a two-reactor hydrocracking process wherein an amorphous base hydrogenation catalyst is employed in the first reactor while a crystalline aluminosilicate base hydrocracking catalyst is employed in the second reactor. The average reaction temperature in the second reactor is maintained generally at the same temperature as or below the temperature employed in the first reactor. The patent discloses that each catalyst is separately maintained in a single bed within each reactor. Alternatively, the two catalysts can be intimately mixed and maintained in a common bed within one reactor.

U.S. Pat. 3,254,017, issued May 31, 1966, discloses a two-stage hydrocracking process wherein an amorphous base hydrogenation catalyst is employed in the first stage while a crystalline aluminosilicate base hydrocracking catalyst is employed in the second stage. In the first stage, metal impurities are removed from the feed while organic sulfur compounds and organic nitrogen compounds are converted respectively to hydrogen sulfide and ammonia. In addition in the first stage, hydrocracking reactions are effected with the amorphous catalyst to convert residual fractions to gas oil. In the second stage, hydrocracking of gas oil to gasoline boiling range products is effected. The temperature in the second stage is maintained generally lower than the temperature in the first stage. While more than one reactor can be used for the second stage, each reactor contains a single catalyst bed.

The prior art and processes disclosed by the above-identified patents, is seriously deficient in that the most effective use is not made of the heat produced during the exothermic hydrocracking reaction. This is due to the prior art practice of controlling the heat produced during the hydrocracking reaction within very narrow temperature ranges to maintain either relatively constant reactor bed outlet temperatures or lower temperatures in the later stages of reaction. By this kind of operation, the proportion of hydrogen gas used for cooling relative to the total hydrogen gas requirements for the prior art hydrocracking processes can amount to as high as about 60 percent. Thus, the prior art processes must employ an inordinately large portion of cooling fluid such as a hydrogen containing gas for cooling in addition to that needed for reaction.

SUMMARY OF THE INVENTION

In accordance with the present invention a hydrocracking process is provided wherein a petroleum hydrocarbon feed material boiling above gasoline boiling range material is passed through a sequence of catalyst beds wherein at least the initial catalyst beds include a hydrogenation catalyst suitable for converting nitrogen and sulfur compounds in the hydrocarbon reactant material respectively to ammonia and hydrogen sulfide and the remaining catalyst beds include one or more hydrocracking catalysts of the same or different conversion operating characteristics through which all or a part of the effluent obtained from the hydrogenation treating step may be passed. In one particular embodiment of this invention a plurality of separate catalyst beds is maintained in one or more sequentially arranged reactors through which the hydrocarbon reactant together with hydrogen rich gas is passed, preferably in a generally ascending temperature profile. Thus, as the hydrocarbon reactant material moves generally downwardly through the sequence of catalyst beds in the reactor the effluent recovered at the outlet of each catalyst bed is collected to equalize the temperature of the effluent and in most instances is cooled in a collection zone by mixing with hydrogen rich cooling gas and in other instances is not cooled but only "temperature-leveled" to avoid "hot spots" as the hydrocarbon materials and hydrogen rich gas progresses downwardly. Thus while the bed outlet temperatures are generally reduced by cooling in a collection zone to a temperature somewhat above the respective bed inlet temperatures in some instances no cooling is employed, but only "temperature-leveling" to avoid "hot spots" before passing to the next succeeding catalyst bed.

It is intended, however, in the arrangement of this invention that the hydrocarbon feed being processed be passed downwardly through a plurality of suitably arranged catalyst beds in admixture with hydrogen-rich gas so that it first contacts a catalyst suitable for effecting conversion of organic nitrogen and sulfur compounds in the feed to ammonia and hydrogen sulfide and in some instances some conversion by hydrocracking of the hydrocarbon feed material. Thereafter the hydrocarbon material without separation of ammonia therefrom is passed in contact with a nitrogen tolerant catalyst at a generally higher temperature. In this arrangement it is intended that the hydrogenation catalyst be of such an activity that it will perform its desired denitrogenation and desulfurization function at a relatively low temperature which is preferably lower than the temperatures considered most suitable for use with the nitrogen tolerant hydrocracking catalyst maintained in the subsequent catalyst beds. Furthermore the total effluent obtained from the hydrogenation catalyst treatment including ammonia and hydrogen sulfide produced therein as well as other reaction conversion products is then passed without cooling or separation of gaseous material such as ammonia through one or more sequentially arranged beds of nitrogen tolerant hydrocracking catalysts with bed outlet temperatures generally ascending from catalyst bed to catalyst bed. The effluent separated from each of the subsequent hydrocracking catalyst beds is collected so as to adjust the total effluent to a uniform temperature before the effluent passes to the next succeeding catalyst bed. In some instances hydrogen rich cooling gas may be introduced into the collected effluent between the catalyst beds and prior to passing the effluent into contact with the next succeeding adjacent bed of hydrocracking catalyst to bring about the aforementioned generally increasing temperature pattern secured as the result of the exothermic temperature increase in each of the catalyst beds and the cooling by injection of hydrogen rich gas into the collected effluent between some or all of the beds. Thus by operating in the manner of this invention and providing for uniformity in the temperature of the reactant entering each catalyst bed while allowing for an increase in temperature of the reactants generally in the direction of flow of reactant material through the catalyst beds a considerable reduction in the amount of cooling fluid employed may be realized along with the other advantages herein discussed. Generally the temperature maintained within the lower temperature hydrogenation catalyst beds is within a range of from about 650° F. to about 750° F. and the temperature maintained within the higher temperature hydrocracking catalyst beds is within a range of from about 725° F. to as high as about 950° F. In the method of this invention it is to be understood that since the concentration of ammonia may increase during reaction in the direction of reactant flow it is contemplated allowing the temperature to increase so as to accommodate this condition and maintain desired conversion with the nitrogen tolerant catalysts. Thus, the amount of the reactant temperature increase from bed to bed will be dependent in part upon the particular nitrogen tolerant hydrocracking catalyst employed in the process.

The present invention is based upon a concept which relies upon the exothermic characteristics of hydrocracking catalysts, their tolerance to nitrogen and the arrangement of at least two different catalysts permitting an increase in operating temperatures in the direction of reactant flow to secure the best results. More specifically, it may be said that the combined catalytic system of the present invention is designed to operate on an ascending temperature profile pattern by the use of nitrogen tolerant catalysts which permit the use of higher temperature operating conditions following a hydro-treating and/or low temperature nitrogen sensitive hydrocracking catalyst in a manner so that relatively little or no recycle gas quench is required to control any one catalyst bed temperature to the desired operating temperature. Thus, it becomes clear that the recycle gas quench not required or used in such a dual catalyst system having an ascending temperature profile would be available for use with additional feed stock thereby providing an increased feed stock processing capacity as well as obtaining increased gasoline production as a result of the sequence of operating steps provided.

In yet another embodiment, the concept of the present invention can be used to advantage, for example, in a two-reactor hydrocracking system such as shown in the attached figure wherein a nitrogen tolerant hydrocracking catalyst is normally employed in the lower part of the first reactor with a hydrogenation catalyst in the upper part as above described, while hydrocracking catalysts of different nitrogen tolerance level are employed in the second reactor. Thus, in this latter embodiment it is contemplated using a combination of different hydrocracking catalysts suitably arranged in sequence to operate under initial conditions of relatively high concentrations of ammonia in a first reactor and thereafter at controlled ammonia levels in a second reactor with one or more hydrocracking catalysts of the same or different nitrogen-tolerance. In this arrangement, the most nitrogen tolerant catalyst operating at relatively higher temperature is employed in the downstream catalyst beds of each reactor in the system in a manner where exposure of the hydrocarbon reactant material would result in conversion thereof while sequentially flowing through the catalyst beds generally in an ascending temperature profile pattern. In the event, however, that the presence of nitrogen compounds over and above that which would normally be present in the effluent materials leaving the upper catalyst beds particularly in the instance of the second reactor were too low to force the more nitrogen tolerant catalyst to operate at a more efficient higher temperature, then it is proposed that a compound of nitrogen such as ammonia in suitable concentrations would be injected into the system between desired catalyst beds comprising the upper low temperature hydrocracking catalyst beds and the lower high temperature nitrogen tolerant hydrocracking catalyst beds. Thus it may be said that by practicing the concept of this invention an ascending temperature pattern will prevail generally in the various catalyst arrangements and the use of temperature adjusting quench or cooling gas in any given arrangement will be substantially reduced and held to a minimum. Furthermore, because of the generally ascending temperature pattern provided through the sequence of catalyst beds by the method of the present invention more heat will be available in the final stages of hydrocracking to sustain the severity of operation and the reactor effluent will be more suitable for indirectly preheating the feed stock charged to the process or for other useful purposes. It is unlikely, therefore, that any significant additional heating capacity external to the reactors would be required for a significant increase in feed throughput.

In the process of this invention employing the concepts of operation above-identified the effluent from the final catalyst bed of a plurality of catalyst beds in a reactor is removed and cooled, for example, by indirect heat exchange with the incoming feed to the reactor. The effluent thus partially cooled may be further cooled and then separated to obtain fractions including hydrogen-rich gas, ammonia and hydrogen sulfide, gasoline boiling range conversion products and unconverted or partially converted hydrocarbon feed material. The gasoline boiling product is recovered and the hydrogen rich gas in recycled to the process as desired either before or after removal of ammonia and hydrogen sulfide therefrom or a portion thereof. The partially converted hydrocarbon material remaining may be recycled to the process with the fresh feed or other partially converted feed. It is generally preferred, however, that this partially converted material be returned for conversion to gasoline by recontact with the hydrocracking catalyst provided in the process except when valuable heavier-than-gasoline compounds such as jet or diesel fuel are desired. That is, the partially converted hydrocarbon reactant material may be recycled for contact with only the nitrogen tolerant hydrocracking catalyst employed following the hydrogenation catalyst or as indicated in the attached drawing the partially converted hydrocarbon material may be passed to a second and separate catalyst reactor stage containing a plurality of separate catalyst beds having the same or different ammonia tolerant high temperature hydrocracking catalyst in the lower beds and, when desirable, nitrogen sensitive low temperature characteristic catalyst in the upper beds. In any event, the partially converted hydrocarbon may be passed in contact with ammonia sensitive low temperature hydrocracking catalyst provided in the process since this partially converted material has been subjected to relatively severe hydrotreatment conditions previously, and nitrogen and sulfur compounds have been reduced to desired low levels. In the event that a second reactor is employed as shown in the drawing, FIG. I, it is proposed that the second reactor contain a plurality of separate catalyst beds of different hydrocracking catalysts as above-described. That is, the catalyst employed in the second reactor may be a continuation of different ammonia tolerant catalyst or the catalyst in the upper beds may be ammonia sensitive catalyst with low temperature operating characteristics arranged to achieve the ascending temperature concept of this invention. The high temperature catalyst being the more ammonia tolerant would be located below the less ammonia tolerant low temperature hydrocracking catalyst bearing in mind that provisions are provided for adding ammonia to the lower portion of the reactor containing the more ammonia tolerant hydrocracking catalyst in order to achieve the desired conversion at higher temperature levels. Thus, in any of these arrangements the concept of a generally increasing or ascending temperature profile which takes advantage of generated exothermic heat in the direction of flow of hydrocarbon reactants through the catalyst beds is practiced.

It is to be further understood that the method of this invention is intended to be employed in conjunction with adjusting the thickness of the catalyst beds, particularly the thickness of the hydrocracking catalyst beds employed, as a means of controlling the generated exothermic temperature rise in any one catalyst bed while providing for a general temperature increase throughout the plurality of catalyst beds in the direction of hydrocarbon reactant flow therethrough.

BRIEF DESCRIPTION OF THE DRAWINGS

FIG. I presented herewith provides an arrangement of apparatus in diagrammatic elevation illustrating one method of practicing the invention employing at least two multicatalyst bed reactors in conjunction with a common fractionator system.

FIG. II presented herewith provides an arrangement of apparatus in diagrammatic illustration employing a single multicatalyst bed reactor for practicing the method of the invention.

DESCRIPTION OF SPECIFIC EMBODIMENTS

Referring now to FIG. I, a hydrocarbon charge from conduit 2 is preheated in heat exchanger 4 wherein it is passed in indirect heat exchange relationship with the effluent from reactor 6. The preheated charge is then directed through conduit 8 and through heater 14 for final adjustment of temperature required for the inlet of reactor 6. The heated charge is directed through conduit 9 and mixed with a suitably preheated hydrogen-rich gas obtained from conduit 10 with the resultant mixture being directed through conduit 12 to the top of reactor 6. In some operating instances no heating of the feed will be required in heater 14. In reactor 6 the charge-hydrogen mixture is passed downwardly through a plurality of catalyst beds 16, 18, 20 and 22. The catalyst beds 16 and 18 contain a hydrogenating catalyst which effects conversion of organic nitrogen and sulfur compounds in the feed to ammonia and hydrogen sulfide and also renders other contaminants innocuous to the performance of hydrocracking catalysts by chemical addition of hydrogen. The temperature of the reactants at the inlet of catalyst bed 16 is maintained above the hydrogenation threshold temperature and generally between about 600° F. and about 700° F. The effluent from catalyst bed 16 having reached a temperature of 700° F. to 750° F. by reason of exothermic reactions is collected beneath the bed of catalyst so as to adjust the temperature of the effluent to a laterally uniform temperature by passage through a restricting passageway shown separating catalyst bed 16 from bed 18. Hydrogen rich gas from conduit 24 may be added to the collected effluent or as shown in zone 26 to facilitate a temperature adjustment should some cooling be desired to maintain a temperature between about 650° F. and about 750° F. The effluent is then directed in sequence through the next succeeding catalyst bed 18 which also contains a hydrogenation catalyst and then through catalyst beds 20 and 22 provided with collecting and temperature adjusting zones 28 and 30. The catalyst beds 20 and 22 may contain a crystalline aluminosilicate base cracking catalyst having a hydrogenation component. In such an event, the average temperature in beds 18, 20 and 22 are generally increasing in the direction of reactant flow and may be respectively maintained between 700° F. and 750° F., between 725° F. and 775° F. and between 775° F. and 825° F. The flow of hydrogen rich gas directed through conduits 24, 32 and 34 to the restricting passageways in zones 26, 28 and 30 is maintained so that the reaction temperature in each zone generally increases as a result of the exothermic characteristics of the reactions and the cooling achieved in zones 26, 28 and 30 as the hydrocarbon passes downwardly through the reactor 6. The effluent from reactor 6 is withdrawn through conduit 36 and is directed to heat exchanger 4. The effluent from heat exchanger 4 is then directed through conduit 38 and cooler 40. The cooled effluent is directed to high pressure separator 42 through conduit 44. In separator 42, hydrogen rich gas containing ammonia and hydrogen sulfide is separated from liquid hydrocarbons at a temperature somewhat above ambient. During cooling of the effluent in cooler 40, injection of water is contemplated to effect removal of most of the ammonia and some of the hydrogen sulfide resulting in an aqueous stream of ammonia, hydrogen sulfide and ammonium sulfide which is withdrawn from separator 42 through conduit 45 and is disposed of appropriately. Since the present invention relies upon maintaining a concentration of ammonia in contact with nitrogen tolerant hydrocracking catalysts, it is foreseen that some ammonia may be left in the recycle gas for recycle purposes where a very nitrogen tolerant catalyst is employed in the lower catalyst beds of the reactor. Otherwise unreacted hydrogen sulfide and traces of ammonia remain in the hydrogen rich gas removed from separator 42 through conduit 46 for recycle to the process. The hydrogen rich recycle gas passing through conduit 46 flows in part through conduits 10 and 12 to the inlet of reactor 6, and in part through conduits 48, 24, 32 and 34 for use between catalyst beds as desired in reactor 6. Relatively pure make-up hydrogen is introduced preferably into the reactor system through conduit 100 which leads to conduit 10 since it is desirable to have the highest purity hydrogen rich gas entering the hydrogenation and initial hydrocracking catalyst stage of the process.

The normally liquid hydrocarbons from separator 42 are directed through conduit 54 to heater 56 wherein they are reheated to an elevated temperature sufficient for introduction to fractionator 58 through conduit 60. In fractionator 58, naphtha boiling range hydrocarbon fractions are separated from higher and lower boiling hydrocarbon fractions. The partially converted higher boiling fraction is removed from fractionator 58 by conduit 64 for passage to heater 94. Prior to entering reactor 62, the partially reacted effluent removed from preheater 94 through conduit 66 is mixed with hydrogen rich gas in conduit 70 and make-up hydrogen rich gas is introduced to the process through conduit 102. The hydrogen-hydrocarbon mixture thus formed is heated if necessary in heater 72 to the desired inlet temperature prior to passing through conduit 68 to reactor 62. The hydrogen-hydrocarbon mixture introduced to reactor 62 passes downwardly through a plurality of catalyst beds 74, 76, 78 and 80. In one embodiment of this invention a low temperature hydrocracking catalyst sensitive to ammonia is used in catalyst beds 74 and 76 and a high temperature ammonia tolerant hydrocracking catalyst is thereafter used in catalyst beds 78 and 80. In reactor 62 the temperature is controlled to achieve an ascending profile as the feed passes downwardly through the reactor in the same manner as discussed with respect to reactor 6. The amount of hydrogen rich gas introduced to zones 82, 84 and 86 in reactor 62 is regulated in a manner to achieve the desired temperature profile in the reactor. The hydrogen rich gas is directed to the restricting passageways shown in zones 82, 84 and 86 through conduits 88, 89, 90 and 92 respectively. As described hereinbefore, ammonia can be added to the hydrogen rich gas flowing to zones 84 and 86 through conduits 90 and 92 as desired and this will depend upon the nitrogen tolerance of the catalyst employed in catalyst beds 78 and 80. The effluent from reactor 62 is directed to heat exchanger 94 through conduit 96 to preheat the partially converted effluent from fractionator 58 passing through conduit 64. The effluent removed from heat exchanger 94 is cooled in cooler 98 and thereafter the effluent is directed to a high pressure separator 50 by conduit 51. Normally liquid hydrocarbons are withdrawn from separator 50 through conduit 52 and admixed with liquid hydrocarbons in conduit 54 being passed to heater 56 and fractionator 58. Hydrogen rich gas passing from separator 50 through conduit 53 is recycled to reactor 62 through conduits 70 and 68 after joining with partially converted feed from conduit 66. Make-up hydrogen rich gas is supplied as required to this reaction stage of the process through conduit 102.

In FIG. II, a single reactor system comprising a plurality of catalyst beds is shown. In this arrangement, the upper section comprising approximately two catalyst beds are provided with the hydrogenation catalyst and the lower section comprising two or more (up to four) catalyst beds which lower beds of catalyst are shown increasing in bed depth in the direction of reactant flow downwardly through the recator contain an ammonia tolerant catalyst as hereinbefore discussed.

In the arrangement of FIG. II the hydrocarbon charge in conduit 1 passes through indirect heat exchanger 3 and conduit 5 to furnace 7. The preheated hydrocarbon charge is then passed by conduits 9 and 11 to reactor 13. Make-up hydrogen rich gas may be added to the process by conduit 15. Hydrogen rich recycle gas in conduit 17 is added to the hydrocarbon charge introduced to the reactor by conduit 11. In reactor 13, the upper catalyst beds 19 and 21 contain hydrogenation catalyst and the lower catalyst beds 23, 25, 27 and 29 contain nitrogen tolerant hydrocracking catalyst or catalysts. Between the beds of catalyst, apparatus provisions are made for collecting the hydrocarbon effluent discharged from each bed so that the temperature of the effluent may be adjusted to a relatively laterally uniform temperature either by mixing alone or by the addition of a temperature adjusting fluid before the effluent is passed through a confined passageway to achieve a desired uniform temperature for contact with the next adjacent bed of hydrocracking catalyst. Provisions are made by conduits 31 extending from conduits 17 and 59 to their respective confined passageways for adding recycle gas for adjusting the temperature of the effluents passing through the passageways. Although it is preferred to minimize reduction in temperature with the added recycle gas quench between catalyst beds, nevertheless this does provide a readily available source of quench gas should the need arise. However, as indicated herein it is not necessarily intended that significant quenching with the hydrogen containing recycle gas be employed between all beds during normal operation. In the arrangement shown, catalyst beds 23, 25, 27 and 29 are shown increasing in depth in the direction of downward flow of hydrocarbon reactant therethrough. This is not always essential and will be dependent upon the catalyst or catalysts employed and reaction conditions desired in the separate beds of catalyst. Under some conditions of operation it may be desirable to maintain substantially the same bed depth in each of the plurality of catalyst beds. The hydrocarbon product is removed at an elevated temperature from the bottom of reactor 13 by conduit 37 for passage to heat exchanger 3 wherein heat is given up to the hydrocarbon charge supplied through conduit 1. The partially cooled effluent may be further cooled in a cooler not shown and then be passed by conduit 39 to separator 41. Some water may be added directly to the effluent at an appropriate point in the effluent cooling system before the effluent passes to separator 41 for the reasons discussed above with respect to FIG. I (separator 42). A water stream is removed from separator 41 by conduit 43 and a hydrocarbon product effluent stream by conduit 45. The hydrocarbon product stream in conduit 45 may be heated to a higher temperature by means not shown before discharge into fractionator 47. In fractionator 47, the hydrocarbon product stream is separated under conditions to recover an overheated gas stream in conduit 49, a naphtha product stream in conduit 51, a distillate product stream in conduit 56 and a partially converted hydrocarbon stream in conduit 53. A portion of the hydrocarbon stream in conduit 53 may be withdrawn from the process for product needs or further processing through conduit 55. The remaining portion of the partially converted hydrocarbons in conduit 53 is recycled through conduit 57 to the restricted passage between the final hydrogenation zone 21 and the initial hydrocracking zone 23. Alternately this partially converted hydrocarbon stream may be introduced to a restricted passage below or downstream of that introduced between zones 21 and 23. By this arrangement the partially converted hydrocarbon stream may be recycled to that portion of the hydrocracking catalyst in the reactor most suitable for the process conversion requirement. It is also intended that provision be made for introducing ammonia along the recycle gas or alone through any of conduits 31 leading to the restricted passages between catalyst beds 21-23, 23-25, 25-27 and 27-29. Thus the amount of ammonia introduced with quench gas and in the effluent between catalyst beds can be maintained at substantially any desired value and independent of that generated by the catalyst and hydrocarbon reactant employed.

Table 1 below shows one temperature profile pattern one may achieve when employing a process flow arrangement such as shown in FIG. I when for example the catalyst beds 16 and 18 are comprised of cobalt-molybdenum supported on a silica-alumina base and the catalyst in beds 20 and 22 is palladium or a compound of palladium on a crystalline aluminosilicate base. It may also be achieved for example when the catalyst in beds 74 and 76 of reactor 62 is nickel-tungsten sulfide on active amorphous silica-alumina base and the catalyst in beds 78 and 80 of reactor 62 is the same as in beds 20 and 22.

TABLE 1

| Bed | Inlet temp., °F. | Outlet temp., °F. |
| --- | --- | --- |
| 16 | 650 | 725 |
| 18 | 700 | 750 |
| 20 | 725 | 775 |
| 22 | 775 | 825 |
| 74 | 575 | 650 |
| 76 | 625 | 675 |
| 78 | 650 | 700 |
| 80 | 700 | 750 |

The hydrogenated and partially converted hydrocarbon feed may be contacted in the second stage reactor 62 as shown and discussed with respect to FIG. I first with a catalyst which is not particularly nitrogen tolerant and functions most efficiently at relatively low hydrocracking temperatures before contacting the feed with a nitrogen tolerant catalyst at the same or a higher hydrocracking temperature. That is, the catalyst employed at low temperatures, exhibits good selectivity and activity with a relatively low aging rate. Generally, amorphous base catalysts which are considered ammonia sensitive catalysts are effective at the lower conversion temperatures and the ammonia concentration must of necessity be kept low. The degree of hydrocracking that can be obtained without the need for elevating temperature to secure conversion to a degree that causes excessive aging rates for a particular amorphous base catalyst depends to a large extent upon the concentration of ammonia in the atmosphere surrounding the catalyst. Large concentrations of ammonia adversely affect active amorphous base catalyst aging rates because of the need for higher temperatures to effect the desired conversion. Thus, with active amorphous catalysts, the reaction temperature required to achieve desired conversion varies generally inversely with the concentration of ammonia in the atmosphere in contact with the catalyst.

The hydrocarbon feed to be hydrocracked frequently contains substantial quantities of nitrogen compounds, sulfur compounds and other contaminants which have undesirable effects on the activity and selectivity of various types of hydrocracking catalysts. It is, therefore desirable and generally necessary to subject the hydrocarbon feed to a hydrogenation treatment which converts the nitrogen in nitrogen compounds to ammonia and the sulfur in sulfur compounds to hydrogen sulfide, and which renders other contaminants innocuous to the performance of hydrocracking catalysts by chemical addition of hydrogen. After the hydrocarbon feed to be hydrocracked has been subjected to relatively severe hydrogenation pretreatment whereby the unconverted nitrogen compounds have been reduced to a low level in the range of 0.1 to 20 parts per million by weight, the unconverted sulfur compounds have been virtually eliminated, undesirable polynuclear aromatic compounds have been converted to innocuous materials by chemical addition of hydrogen and ammonia and hydrogen sulfide have been removed, the pretreated or partially converted hydrocarbon feed may then be processed over an amorphous base hydrocracking catalyst as discussed above.

Crystalline aluminosilicate hydrocracking catalysts have been found to be generally tolerant to the presence of ammonia under hydrocracking conditions and they also operate at higher temperatures most effectively and efficiently particularly when ammonia is present. Therefore, although it is desirable to first convert a large percentage of the organic nitrogen compounds in the feed to ammonia prior to contacting the feed with a nitrogen tolerant crystalline aluminosilicate catalyst, such catalysts can perform effectively in the presence of the liberated ammonia without the need to separate the ammonia from the reactants entering the aluminosilicate catalyst bed.

CATALYSTS

Active amorphous hydrocracking catalyst

The active amorphous base hydrocracking catalysts referred to herein comprise catalysts containing one or more hydrogeneation components in combination with an active amorphous base cracking component having a pore size above about 20 angstroms and preferably from about 30 to about 200 angstroms. The hydrogenation components which can be employed include the Group VI-B and Group VIII metals of the Periodic Table, including their oxides, sulfides or mixtures thereof. The Group VI-B metals which can be employed include chromium, molybdenum, and tungsten, while the Group VIII metals which can be employed include iron, nickel, cobalt, the platinum group metals, and the palladium group metals. The preferred hydrogenation components are nickel-tungsten sulfide, cobalt-molybdenum sulfide, platinum, and palladium. The active amorphous cracking components which can be used herein include the oxides of metals of Groups II–A, III–A and VI–B of the Periodic Table, as well as silica or mixtures thereof. Examples of amorphous cracking bases which can be employed herein include silica-alumina, silica-zirconia, silica-magnesia, silica, alumina, and the like. The active amorphous base cracking components employed herein are those having an activity index above about 30 and preferably above about 35 as measured by the "Cat A" test described by Alexander and Shimp in National Petroleum News, 36 page R–537 (Aug. 2, 1944).

The hydrogenation component of the active amorphous base hydrocracking catalyst comprises from about 0.1 to about 25 weight percent, based upon the weight of the amorphous cracking base. When noble metals such as platinum or palladium are employed, preferably from about 0.1 to about 6 weight percent, and more preferably from about 0.2 to about 2 weight percent are employed based upon the weight of amorphous cracking base. When the hydrogenation component is other than a noble metal, it is preferred to employ from about 6 to about 18 weight percent thereof, based upon the weight of the amorphous cracking base. The hydrogenation component can be introduced into the active amorphous base by impregnation, coprecipitation on the base surface, by admixture or by other methods well known in the art. A preferred active amorphous base hydrocracking catalyst comprises nickel sulfide and tungsten sulfide in amounts of from 6 to 18 weight percent of the nickel and tungsten metals on an amorphous silica-alumina base containing from 60 to 90 weight percent silica and having an activity index above about 40.

The hydrogenation or pretreating catalyst

The amorphous base hydrogenation catalyst referred to herein comprises one or more hydrogenation components and an amorphous base having pores of a size above about 20 angstroms, and preferably between about 30 and about 500 angstroms. The hydrogenation components which can be employed herein include the Group VI–B and Group VIII metals of the Periodic Table, including their oxides, or their sulfides, or mixtures thereof. The Group VI–B metals which can be employed include chromium, molybdenum, and tungsten, while the Group VIII metals which can be employed include iron, nickel, cobalt, the platinum and palladium group metals. The preferred hydrogenation components are those comprising nickel-tungsten sulfide, nickel sulfide, cobalt-molybdenum sulfide, platinum and palladium in elemental or combined form. The amorphous base components which can be used herein include the oxides of metals of Groups II–A, III–A and IV–B of the Periodic Table, as well as silica or mixtures thereof. Examples of amorphous bases which can be employed herein include silica-alumina, silica-zirconia, silica-magnesia, silica, alumina and the like. The amorphous base components employed herein are those having an activity index between about 5 and about 30 as measured by the "Cat A" test described by Alexander and Shimp in National Petroleum News, 36 page R–537 (Aug. 24, 1944).

The hydrogenation component of the amorphous pretreating catalyst is employed in amounts to effect substantial hydrogenation reaction; that is in amounts to convert the substantial majority of the organic nitrogen and sulfur compounds in the feed to ammonia and hydrogen sulfide respectively. The amount of hydrogenation component employed in the pretreating catalyst depends upon the hydrogenation activity of the particular component employed and may comprise from about 0.1 to about 45 weight percent, based upon the weight of the amorphous cracking base. It is preferred to employ generally from about 5 to about 30 weight percent thereof, based upon the weight of the amorphous cracking base. The hydrogenation component can be introduced into the amorphous base by impregnation, coprecipitation on the base surface, by admixture or by other methods well known in the art.

The zeolite catalyst

The zeolite hydrocracking catalysts employed herein comprise one or more hydrogenation components in combination with a crystalline aluminosilicate zeolite base material having cracking activity. The hydrogenation components which can be employed with the zeolite base include the Group VI–B and Group VIII metals of the Periodic Table, including their oxides or their sulfides, or mixtures thereof. The Group VI–B metals which can be employed include those containing chromium, molybdenum, and tungsten, while the Group VIII metals which can be employed include iron, nickel, cobalt, the platinum and palladium group metals. The preferred hydrogenation components are compounds containing nickel, tungsten, cobalt-molybdenum, platinum and palladium. The zeolite cracking component is a crystalline aluminosilicate structure having uniformly dimensioned pores formed by alumina and silica tetrahedra. There are available at the present time a number of crystalline aluminosilicates, each of which have their own characteristic pore size openings. For purposes of the present invention, it is desirable to employ a crystalline aluminosilicate having pore size openings between about 6 angstroms and about 15 angstroms. The crystalline aluminosilicates employed herein are characterized by a low sodium or alkali metal content of below about 5 weight percent, and preferably below about 2 weight percent, calculated as alkali metal oxide, based upon the weight of the crystalline aluminosilicate.

The zeolites employed herein can be derived from naturally occurring zeolites or synthetic zeolites by employing known base-exchanging techniques. Among the zeolites which can be base-exchanged for use in the present invention are the naturally occurring zeolites such as faujasite, mordenite, chabazite, stilbite, ferrionite, heulandite, dachiaridite, and erionite, and the synthetic zeolites such as zeolites X, Y, B, L and T. These synthetic zeolites are described in U.S. Pat. 3,140,252 issued July 6, 1964. The above zeolites are base-exchanged with fluid containing metal ions which are exchangeable with sodium or alkali metal ions in a manner to obtain a selective high activity cracking catalyst such as described in U.S. Pats. 3,140,249 and 3,140,253 to Plank et al., issued July 7, 1964.

Metallic cations which can be exchanged with the alkali metal ions in the zeolite to improve the cracking activity thereof are those associated with Groups I–B through VIII of the Periodic Table, as well as the rare earths. In addition, the alkali metal can be removed from the zeolite by base exchanging with a hydrogen containing cation such as ammonium ion to obtain the zeolite in hydrogen form. Further, the zeolite can be base exchanged in a manner to replace the alkali metal cation with a mixture of the above metal cations or a mixture of the above metal cations and hydrogen ions. The preferred forms of the zeolite are those containing rare earth metal cations, rare earth metal cations and hydrogen ions or nickel cations since these forms of the zeolite exhibit high cracking activity and good selectivity. In any event, the alkali metal content of the zeolite calculated as alkali metal oxide should be below about 5 weight percent and preferably below about 2 weight percent, based upon the weight of zeolite to obtain the desired cracking activity, selectivity, and catalytic stability.

The hydrogenation component of the zeolite catalyst is usually present in amounts of from about 0.1 to about 25 weight percent, based upon the weight of zeolite cracking base depending upon the hydrogenation metal employed. Noble metal such as platinum or palladium are employed in amounts preferably from about 0.1 to about 6 weight percent and more preferably from about 0.2 to about 2 weight percent, based upon the weight of the zeolite base catalyst. When the hydrogenation metal component is other than a noble metal, it is preferred to employ from about 6 to about 18 weight percent thereof, based upon the weight of the zeolite base catalyst. The hydrogenation component can be introduced into the zeolite base catalyst by ion exchange, impregnation or as a physical mixture or by other methods well known in the art. Preferred zeolite catalysts include hydrogenation components such as nickel sulfide and tungsten sulfide and mixtures thereof in amounts of between about 5 and about 15 weight percent of nickel-tungsten compound, platinum in amounts of from about 0.1 and about 5 weight percent with rare earth containing and/or hydrogen containing zeolite Y or zeolite X. As noted above, the zeolite base catalyst can be employed alone or in association with an active amorphous cracking base.

REACTION CONDITIONS

The reaction conditions employed in accordance with this invention are such that the temperature during the initial stages of contact between feed and catalyst is maintained lower than the temperature in the subsequent and final stages of contact with a nitrogen tolerant catalyst. When employing an amorphous base hydrogenation catalyst in the initial one or two beds and a crystalline aluminosilicate hydrocracking catalyst in subsequent catalyst beds for contacting fresh feed hydrocarbon material the average temperature in the initial amorphous base hydrogenation catalyst beds is maintained in the range of from about 650° F. to about 750° F. and preferably from about 675° F. to about 725° F. The average temperature in the subsequent crystalline aluminosilicate catalyst beds is maintained generally higher and in a range of from about 700° F. to about 1000° F. and preferably from about 750° F. to about 850° F. The average temperature in the later beds is maintained from about 50° F. to about 150° F. higher than the initial stage of catalyst contact. As stated previously, the temperature is allowed to increase from bed to bed as the reactant passes through the plurality of catalyst beds. The catalyst gradually loses activity during its on-stream period so that to maintain relatively constant or desired conversion, the reaction temperature in any one or all catalyst beds may be increased to compensate for this loss in catalyst activity. This can be accomplished by heating the feed to a higher temperature and/or by reducing the amount of quench gas and thereby extracting less heat between stages.

The pressure employed may be selected from within the range of from about 1000 p.s.i.g. and about 3000 p.s.i.g. and will be kept preferably as low as possible consistent with the operation pursued. Liquid hourly space velocity in the range of from about 0.5 v./hr./v. to about 1.5 v./hr./v., and a hydrogen partial pressure in the range of from about 800 p.s.i.g. to about 2500 p.s.i.g., may be employed. The amount of conversion effected in the first hydrogenation catalyst stages is generally of a low order of magnitude and may be from about 3 percent to about 30 percent measured as the volume of products boiling below 400° F. relative to the volume of feed.

The second reactor such as shown in FIG. I can be arranged to contain an amorphous base hydrocracking catalyst in the initial one or more catalyst beds and an ammonia tolerant crystalline aluminosilicate catalyst may be employed in the later catalyst beds. On the other hand all of the catalyst beds may comprise one or more of the crystalline aluminosilicate base hydrocracking catalysts above described. In the event that the first arrangement is employed, some nitrogen compound such as ammonia can be added to the reactants immediately before they contact the crystalline aluminosilicate catalyst so as to achieve the conversion therein under the higher temperature conditions as hereinbefore discussed.

In this arrangement the second reactor containing an amorphous base hydrocracking catalyst and a crystalline aluminosilicate hydrocracking catalyst, or alternately all crystalline aluminosilicate catalysts, is operated under conditions of progressively increasing temperatures. The increase in temperature varies substantially directly with the ammonia concentration which is maintained in a range of from about 10 p.p.m. to about 500 p.p.m. It can be seen from the above discussion that the ammonia concentration can be varied within a reactor substantially as desired depending upon the catalyst type, sequence, and reaction temperature employed in the system by injecting ammonia into the collected effluents between catalyst beds. Generally the conditions of temperature, pressure and liquid hourly space velocity are maintained within the ranges and in the manner described above.

The reactors employed may contain substantially any number of separate catalysts beds of the same depth or varying in depth and preferably increasing in depth in the direction of reactant flow at least through the nitrogen tolerant hydrocracking catalysts. A reactor can contain from 2 to 8 separated catalyst beds and preferably no more than about 6 catalyst beds. With less than three catalyst beds, the advantages obtained with internal temperature control become minimal. With more than 6 catalyst beds, the reactor internal structure is increasingly complex so that a reactor of this design tends to be less economical to fabricate and operate.

CHARGE STOCK

Hydrocarbon feeds which can be processed by the method of the invention are substantially any hydrocarbon feeds which can be improved by hydrocracking and particularly those boiling in the range of from about 400° F. to about 1100° F. including distillate and residual hydrocarbon fractions. Some hydrocarbon feeds which can be processed with particular advantage include virgin heavy and light vacuum gas oils, coker gas oil, gas oil from catalytic cracking processes, furfural extracts, light medium and/or heavy virgin gas oils or mixtures thereof.

What is claimed is:

1. A method for hydrocracking a hydrocarbon fraction comprising sulfur and nitrogen compounds to produce lower boiling hydrocarbons including gasoline along with lower and higher boiling hydrocarbon constituents which comprises passing the hydrocarbon feed with a hydrogen rich gas through a plurality of sequentially arranged catalyst beds in whic hat least one initial bed of catalyst is a hydrogenation catalyst which is suitable to convert at relatively low temperatures the nitrogen and sulfur compounds in the charge to ammonia and hydrogen sulfide and thereafter passing the hydrocarbon feed with said ammonia through the remaining sequence of catalyst beds at an ever increasing temperature in the direction of flow of the hydrocarbon feed in which the catalyst beds are hydrocracking catalyst compositions of progressively increasing tolerance to nitrogen which will also tolerate progressively higher temperature operating conditions generated by the exothermic condition of the hydrocracking operation.

2. The method of claim 1 wherein the concentration of ammonia in the hydrocarbon flowing through the beds of catalyst increases in the direction of flow.

3. The method of claim 1 wherein the different hydrocracking catalysts arranged in sequence operate under initial conditions of relatively high concentrations of ammonia in a first reaction zone and at controlled ammonia levels in a second reaction zone by the addition of ammonia to the reactants between catalyst beds in an amount sufficient to optimize the function of the catalyst it contacts.

4. The method of claim 1 wherein the temperature of the hydrocarbon effluent recovered from the last of the sequence of catalyst beds is sufficiently high to provide the major portion of the heat required by indirect heat exchange to the hydrocarbon fuel passed into contact with the initial bed of catalyst.

5. The method of claim 1 wherein the initial catalyst bed comprises an amorphous base hydrogenation-denitrogenation catalyst and the hydrocracking catalysts of different nitrogen tolerance level comprise a crystalline aluminosilicate catalyst dispersed with a noble metal hydrogenation component.

6. The method of claim 1 wherein materials comprising vaporous and liquid material are collected between beds of catalyst and brought to a temperature uniformity before redistribution and passage through the next succeeding bed of catalyst.

References Cited

UNITED STATES PATENTS

| | | | |
|---|---|---|---|
| 3,254,017 | 5/1966 | Arey et al. | 208—59 |
| 3,287,252 | 11/1966 | Young | 208—59 |
| 3,368,964 | 2/1968 | Ch'in et al. | 208—60 |
| 3,404,085 | 10/1968 | Hamner et al. | 208—111 |

DELBERT E. GANTZ, Primary Examiner

T. H. YOUNG, Assistant Examiner

U.S. Cl. X.R.

208—57, 111